US011557077B2

United States Patent
Distler et al.

(10) Patent No.: US 11,557,077 B2
(45) Date of Patent: Jan. 17, 2023

(54) SYSTEM AND METHOD FOR RETEXTURING OF IMAGES OF THREE-DIMENSIONAL OBJECTS

(71) Applicant: LiveSurface Inc., Brooklyn, NY (US)

(72) Inventors: Joshua D. I. Distler, Brooklyn, NY (US); Michael Litvin, Tel Aviv (IL); Ariel Shamir, Jerusalem (IL)

(73) Assignee: LIVESURFACE INC., San Diego, CA (US)

( * ) Notice: Subject to any disclaimer, the term of this patent is extended or adjusted under 35 U.S.C. 154(b) by 0 days.

(21) Appl. No.: 15/136,949

(22) Filed: Apr. 24, 2016

(65) Prior Publication Data

US 2017/0032563 A1 Feb. 2, 2017

Related U.S. Application Data

(60) Provisional application No. 62/152,401, filed on Apr. 24, 2015, provisional application No. 62/152,403, filed on Apr. 24, 2015.

(51) Int. Cl.
*G06T 15/04* (2011.01)
*G06T 17/20* (2006.01)
*G06T 11/00* (2006.01)

(52) U.S. Cl.
CPC ............ *G06T 15/04* (2013.01); *G06T 11/001* (2013.01); *G06T 17/20* (2013.01)

(58) Field of Classification Search
CPC ........ G06T 15/04; G06T 11/001; G06T 17/20

USPC .......................................................... 345/419
See application file for complete search history.

(56) References Cited

U.S. PATENT DOCUMENTS

| | | | | |
|---|---|---|---|---|
| 2005/0052452 A1* | 3/2005 | Baumberg | ............. | G06T 15/20 345/419 |
| 2005/0162419 A1* | 7/2005 | Kim | ........................ | G06T 15/00 345/419 |
| 2007/0146389 A1* | 6/2007 | Distler | .................... | G06T 15/04 345/629 |
| 2011/0254841 A1* | 10/2011 | Lim | .......................... | G06T 7/00 345/421 |
| 2013/0016098 A1* | 1/2013 | Addessi | .................. | G06T 19/20 345/420 |

OTHER PUBLICATIONS

Alexis Andre and Suguru Saito, Single-View Sketch Based Modeling, EUROGRAPHICS Symposium on Sketch-Based Interfaces and Modeling (2011), pp. 133-140.*

* cited by examiner

*Primary Examiner* — Hai Tao Sun
(74) *Attorney, Agent, or Firm* — Steven R. Vosen

(57) ABSTRACT

Systems and methods are described for retexturing portions of surface in a 2-D image, where the surface is an image of a 3-D object. The systems and methods analyze, with user input, the 2-D image and then, in computer memory, generate a 3-D model of the imaged surface. The surface may then be retextured, that is, for example, artwork may be added to the 2-D image in a realistic manner, taking into account a 3-D geometry in the scene of the 2-D image.

26 Claims, 6 Drawing Sheets

SYSTEM AND METHOD FOR RETEXTURING OF IMAGES OF THREE-DIMENSIONAL OBJECTS

CROSS-REFERENCE TO RELATED APPLICATIONS

This application claims the benefit of U.S. Provisional Application No. 62/152,401, filed Apr. 24, 2015, and of U.S. Provisional Application No. 62/152,403, filed Apr. 24, 2015, the entire contents of which are hereby incorporated by reference herein and made part of this specification.

BACKGROUND OF THE INVENTION

Field of the Invention

The present invention relates to the field of image generation. More particularly, the present invention relates to methods and apparatus that deliver imagery with embedded data that can be used to efficiently render design concepts.

Discussion of the Background

In rendering images of the physical world, artists represent a three-dimensional (3-D) scene on a two-dimensional (2-D) canvas. This requires the artist to use their knowledge of perspective to produce a realistic image when drawing or painting, for example. Similar skills are required when creating or modifying digital artwork. Thus, photo manipulation of images, whether adjusting, modifying or adding imagery to existing images or creating altogether new images, often requires the artist to use these same skills as when painting or drawing.

As an example, an artist may make use of computer's photo manipulation software to modify an image of a coffee cup such that it appears to have different artwork on its surface. This requires numerous manual 2-D manipulations to attempt to simulate the perspective and surface curves of the cup. These 2-D manipulations are extremely time consuming, often provide a less than realistic result and often require far more time than the time involved in creating the new label design itself.

There is no simple way of easily applying artwork to an image of a 3-D structure, short of the photo manipulation software having access to information on the 3-D structure of objects in the image.

Thus, for example, the use of 3-D structure data of objects embedded the image to realistically place artwork is described, for example, in U.S. Pat. No. 8,866,841, the entire contents of which are incorporated herein by reference.

Alternatively, a 3-D model may be constructed from multiple images, by making assumptions about the geometric shape of the objects, or by iteratively modifying 3-D models to best reconstruct how the objects appear in 2-D. All of these techniques are time consuming and/or require equipment to develop a 3-D model. Moreover, the texture mapping that is produced by these methods isn't continuous, thus making it difficult to use for retexturing.

There is a need in the art for device and method for developing 3-D models of objects within a single image. Such devices and methods should be easy to use, provide representations of the objects sufficiently detailed to cause artwork placed on the image to appear as it includes the proper perspective, and should be compatible with other image processing software and systems. The models such developed should also allow for meshing of the surface and/or changing the appearance of the surface ("retexturing"). The models such developed should also produce texture maps with no or little distortion.

BRIEF SUMMARY OF THE INVENTION

The present invention overcomes the disadvantages of prior art by providing a system and method for retexturing artwork in an image. Thus, one embodiment is a device, executed as a computer program, which allows modeling 3-D objects from a single regular 2-D photograph, with minor interaction from a non-professional user. A parameterization is implicitly maintained throughout the modeling process to allow for convenient texture mapping. The resulting parameterization is evaluated to allow the user to take special care of areas with significant distortion.

It is one aspect of the present invention to provide a method implemented on a computer having memory, a processor, and a display. The method includes: accepting a file containing a 2-D image of a 3-D scene into memory, where the 2-D image includes a 2-D surface that is an image of a 3-D surface of an object in the 3-D scene; generating a 3-D model, which is a mathematical or code-based description or set of instructions used by a computer to generate, display, or manipulate an approximation of the 3-D surface of the object in the 3-D scene, where the generating includes: forming a perspective model, where the perspective model includes a mathematical transformation for: 1) projecting points from the 3-D model to the 2-D image, and 2) re-projecting points from the 2-D image to the 3-D scene, defining a first silhouette segment of the 2-D surface, defining a second silhouette segment of the 2-D surface, defining one or more profile curves each extending from the first silhouette segment to the second silhouette segment, identifying a spine disposed between the first segment and the second segment, re-projecting the spine to a 3-D spine in the 3-D scene, obtaining geometric information related to the object in the scene, re-projecting each of the one or more profile curves to a corresponding 3-D profile curve, where each 3-D profile curve is in a corresponding profile plane perpendicular to the 3-D spine, where the re-projecting includes using the obtained geometric information, forming a 3-D model by interpolating the one or more profile segments along the 3-D spine, and displaying the 3-D model on the display.

It is another aspect of the present invention to provide a system comprising: a computer having memory, a processor, and a display. The memory includes instructions for the processor perform the steps of: accepting a file containing a 2-D image of a 3-D scene into memory, where the 2-D image includes a 2-D surface that is an image of a 3-D surface of an object in the 3-D scene; generating a 3-D model to approximate the 3-D surface of the object in the 3-D scene, where the generating includes: forming a perspective model, where the perspective model includes a mathematical transformation for: 1) projecting points from the 3-D model to the 2-D image, and 2) re-projecting points from the 2-D image to the 3-D scene, defining a first silhouette segment of the 2-D surface, defining a second silhouette segment of the 2-D surface, defining one or more profile curves each extending from the first silhouette segment to the second silhouette segment, identifying a spine disposed between the first segment and the second segment, re-projecting the spine to a 3-D spine in the 3-D scene, obtaining geometric information related to the object in the scene, re-projecting each of the one or more profile curves to a corresponding 3-D profile curve, where each 3-D profile curve is in a corresponding profile plane perpendicular to the 3-D spine, where the re-projecting includes using the obtained geometric information, forming a 3-D model by interpolating the one or more profile segments along the 3-D spine, and displaying the 3-D model on the display.

These features together with the various ancillary provisions and features which will become apparent to those skilled in the art from the following detailed description, are attained by the method and system of the present invention, preferred embodiments thereof being shown with reference to the accompanying drawings, by way of example only, wherein:

Reference symbols are used in the figures to indicate certain components, aspects or features shown therein, with reference symbols common to more than one figure indicating like components, aspects or features shown therein.

DETAILED DESCRIPTION OF THE INVENTION

Figure 1:
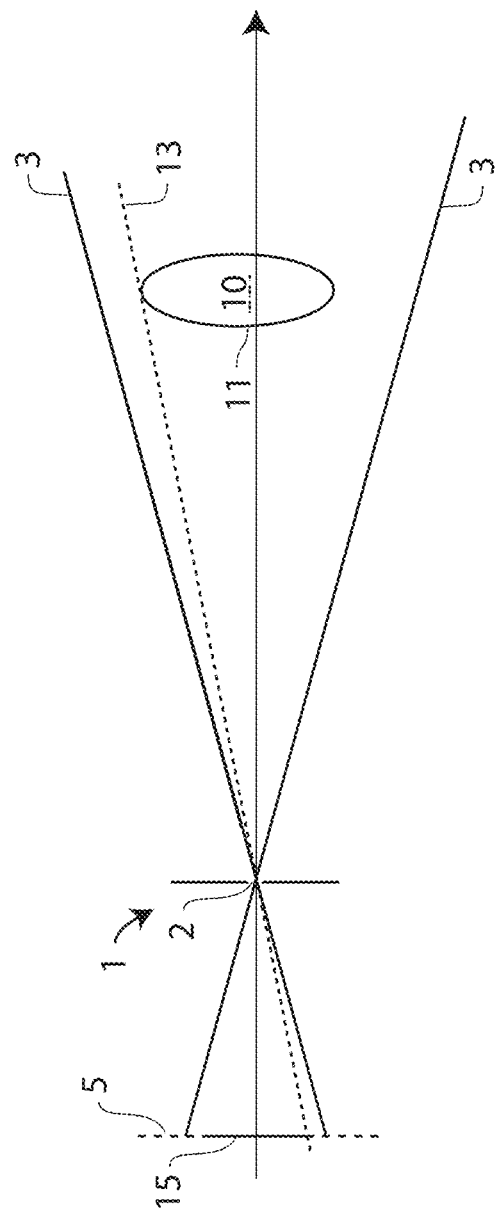
FIG. 1 illustrates the side view of a camera having an aperture that captures an image at focal plane of an object.

FIG. 1 illustrates the side view of a camera 1 having an aperture 2 that captures an image 15 at focal plane 5 of an object 10. Thus, for example, object 10 has a front surface 11 facing aperture 2. Light rays from front surface 11, such as ray 13, pass through aperture 2 and form image 15 of front surface 11. While camera 1 generally includes a lens and an adjustable aperture, FIG. 1 illustrates the relationship between object 10 and image 15 which will be useful in the following discussions. Further, use of the embodiments described herein do not require that image 15 is a photographic image of an object, and it will be appreciated that and image processed according to the following embodiments may have been drawing by a person, with or without the aid of a computer, or may be a computer generated image from a virtual object 10.

What is of interest herein, in part, is how to analyze a 2-D image, such as image 15, to allow one to realistically modify a surface in the image. Thus, for example, one may wish to illustrate how a drawing appears on the surface of a T-shirt that is being worn by a person that is, how does 2-D artwork appear on flat surface when that flat surface is at an angle or has folds, for example.

In general, depth information, that is how various parts of surface 11 vary in distance from camera 1 or from the point of view of the observer, is generally not available from image 15, and thus the three-dimensional structure of object 10 is not easily obtained from a view of an object. Under certain conditions, such by analyzing the locations of images of fiducial markers, or when the shape of object 10 is known a priori, it may be possible to determine the three dimensional shape and orientation of the object. The concern here is the more general case, where these markers are not necessarily present.

Various embodiments described herein determine the three-dimensional shape of a surface in a 2-D image by identifying portions of the image that can be used to construct a 3-D surface that is an approximation of the actual (or drawn or computer generated) imaged object, and using those portions to generate a 3-D surface, or a model of the 3-D surface. In one embodiment, the 3-D surface is assumed to be the extrusion of a curve having some depth—that is, the curve extends towards the viewer. The 3-D surface is generated by defining, on the image, a pair of silhouette segments, and a spine that is between the pair of silhouette segments, and a profile that extends between the pair of silhouette segments and which is assumed to be the view of surface feature that has some depth. The pair of silhouette segments and spine are then projected into a virtual scene onto a plane that is normal to the viewing angle, the profile is projected into the virtual scene such that each end of the profile ends at one of the two projected silhouette segments and the intermediary points are in a plane that is normal to the projected silhouette segments and spine and which extends towards the viewer, and the projected profile is then moved parallel to the projected spine.

Figure 2A:
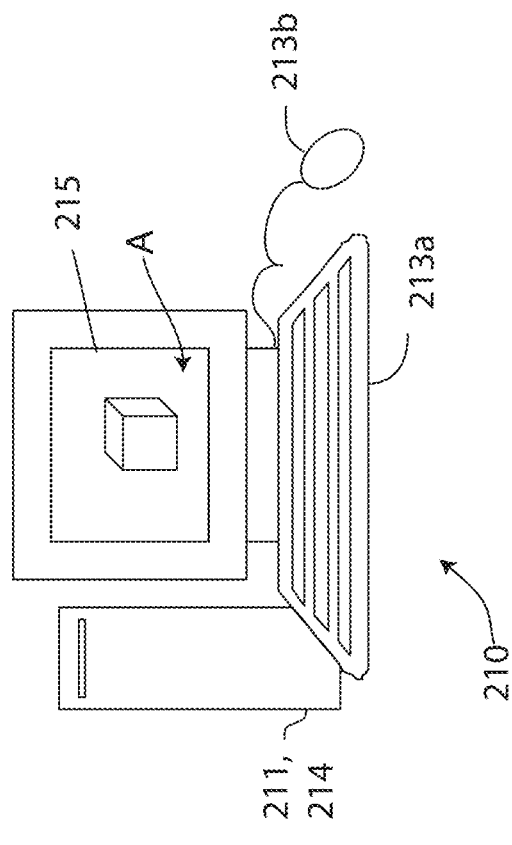
FIG. 2A is one embodiment of a computer system for processing and displaying 2-D images.

FIG. 2A is one embodiment of a computer system 210 for processing and displaying 2-D images as described herein. System 210 includes a processor 211 and memory 214, one or more input devices 213, and a display 215. The input devices 213 include, but are not limited to a keyboard 213a and a graphical input device, such as a mouse 213b, or a touch screen included in display 215. Computer system 210 is particularly adapted for the production, manipulation, and or generation of images (shown, for example as image or graphical user interface (GUI) A on display 215), may also include additional devices (not shown) including but not limited to printers, additional displays, and additional or other input devices, and additional processors and/or memory. In one embodiment, computer system 210 includes the ability to execute instructions of an imaging application to generate or manipulate image files to produce images. Thus, for example and without limitation, computer, or processing system 210 and/or 220 may include computer readable hardware storage medium storing computer readable instructions that, when executed by at least one processor of a processing system, cause the processing system to carry out various methods, as described herein.

Figure 2B:
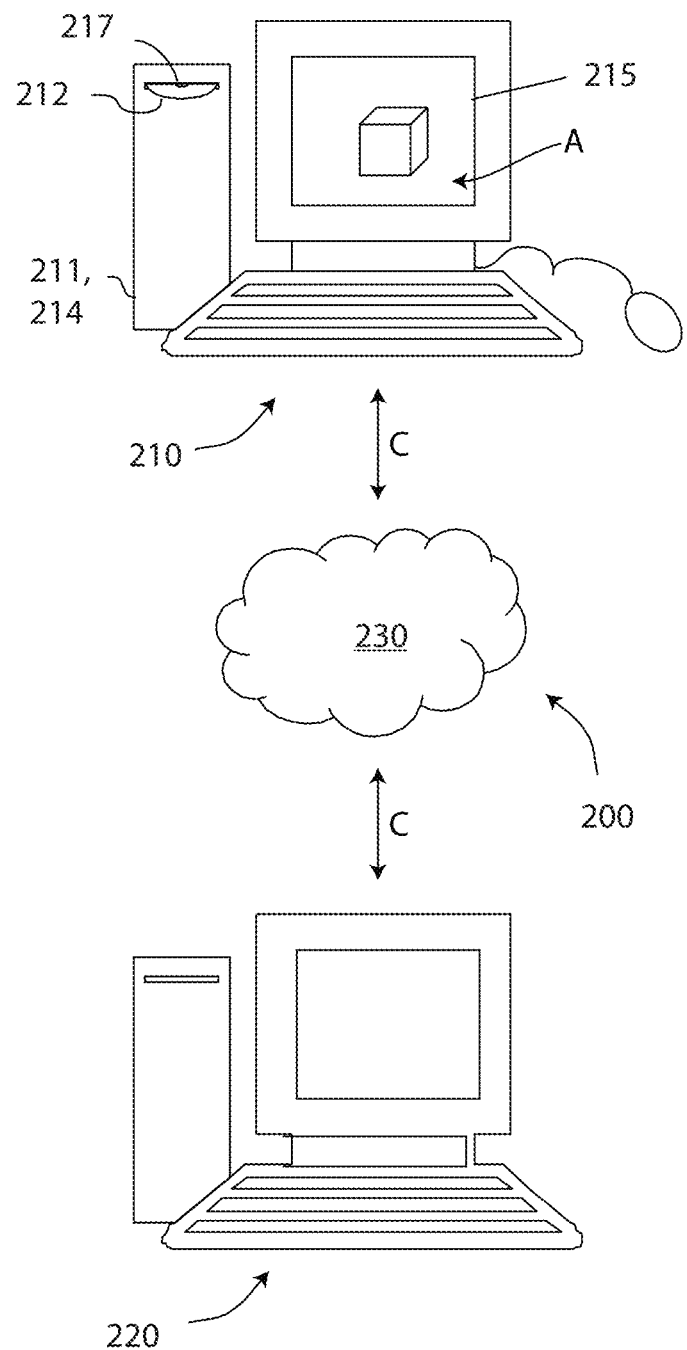
FIG. 2B is another embodiment of a computer system for processing and viewing image files.

FIG. 2B is another embodiment of a computer system 200 for processing and viewing image files as described herein. System 200 may be generally similar to the embodiment illustrated in FIG. 2B, except as further detailed below. Where possible, similar elements are identified with identical reference numerals in the depiction of the embodiments of FIGS. 2A and 2B.

System 200 illustrates a system for the transfer of image files or other information to or from computer system 210. As shown in FIG. 2B, system 200 also includes a second computer system 220, and a network 230. Network 230 may be, but is not limited to, combinations of one or more wired and/or wireless networks adapted to transmit information between computers and may be, without limitation, the Internet or any other communication system. Computer systems 210 and 220 may communicate through network 230, as indicated by arrows C. Communications includes, but is not limited to, e-mail or the mutual access to certain web sites. In addition, FIG. 2B also shows a removable media device 217 of computer system 210, and a removable media 212 being inserted into media device 217. Removable media 212 may be, for example and without limitation, a readable or a read-write device capable of accessing information on a CD, DVD, or tape, or a removable memory device such as a Universal Serial Bus (USB) flash drive.

In one embodiment, image files are provided to computer system 210 on removable media 212. In another embodiment, image files are provided to computer system 210 from computer system 220 over network 230.

In one embodiment, image file is produced entirely on computer system 210. In a second embodiment, the image file is provided to computer system 210 via media 212 or network 230. In a third embodiment, the image file is provided to computer system 210 via media 212 or network 230, and may be uses as a "template" onto which other images or artwork may be added and subsequently manipulated by the embedded data of the image file.

Embodiments are discussed herein illustrating methods for reading an image, such as image 15, into memory 214 of computer system 210, and performing calculations on the image, using programming stored in the memory and executed by the processor 211 of the computer system, and displaying the results on display 215. The following discussions include, in some circumstances, schematics that are illustrative of how certain calculations are performed, by ray tracing, for example, and do not necessarily represent information exactly as stored in computer system 210.

It will be apparent to one skilled in the art that the methods described herein may be programmed into a system, such as computer system 210, to accept images and/or artwork, through an interactive interface that prompts users, on display 215 to, for example and without limitation: provide a location in memory 214 of images and/or artwork for use with some or all of the methods described herein; to allow the user, using input devices 213, to position and/or change the view of such images and/or artwork on the 215; to require or allow the user, through the input devices, to identify certain points, lines, or surfaces on an accepted image or a displayed image; to allow the user to provide input which, for example, may be related to geometric relationships of elements on an accepted image; to manipulate the artwork or images according to some or all of the methods described herein; or to refine curves (such as profile curves, silhouettes, or spines) to obtain better looking results. Example the programming of user interfaces for image manipulation are found for example and without limitation, in commercial image processing software, such as PHOTOSHOP™ and in U.S. Pat. No. 8,866,841, the entire contents of which are incorporated herein by reference. Further, the use of computers for modeling, displaying, and storing 3-D models of objects is well-known in the field and will not be described in detail herein, except as it pertains to inventive features.

Figure 3A:
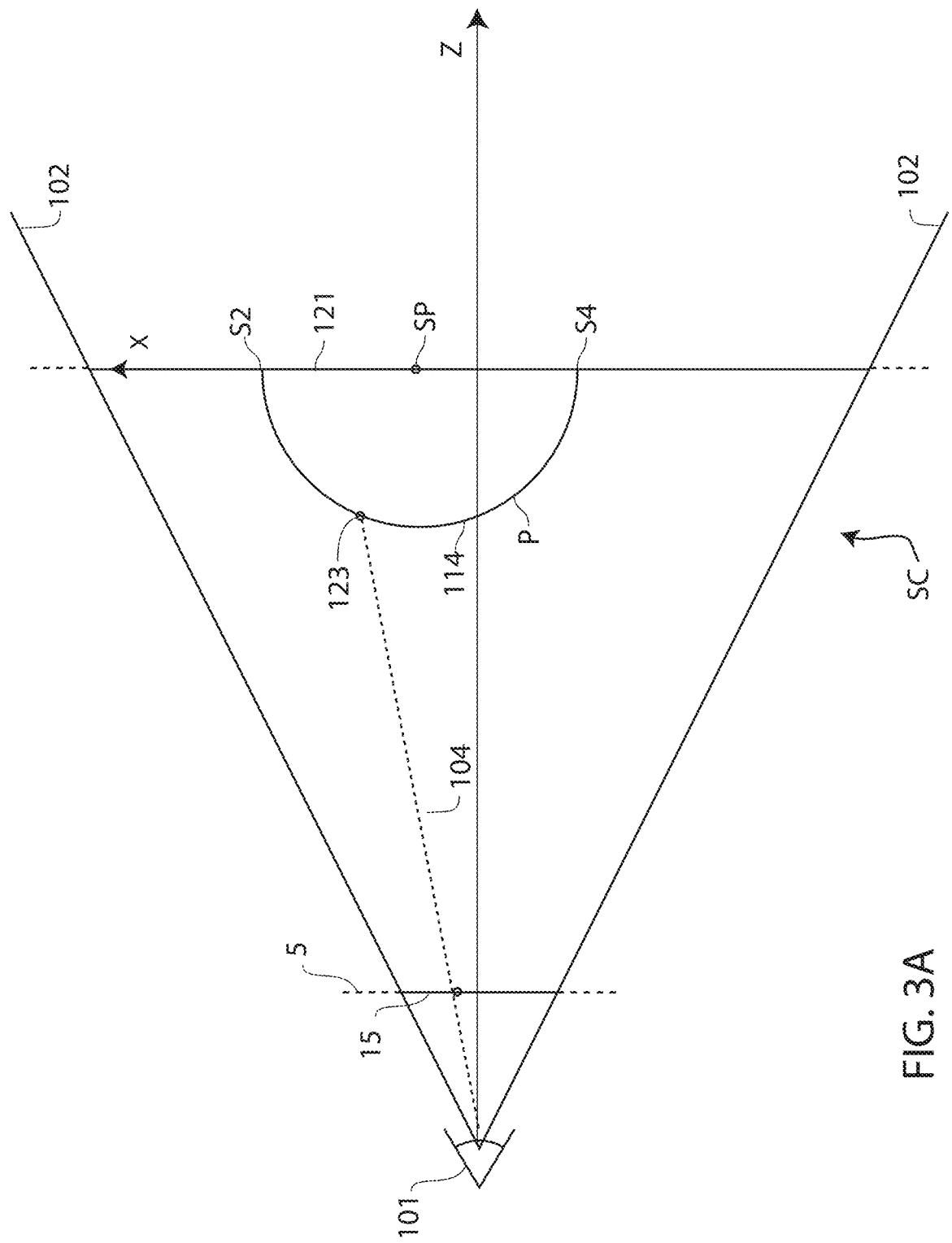
FIG. 3A is a top view illustrating a schematic of the construction of a 3-D surface within as implemented in computer system from an image.

By way of example, FIG. 3A is a top view illustrating a schematic of the construction of a 3-D surface 115 within as implemented in computer system 210 from an image 15, as processed and stored in processor 211 and memory 214.

Figure 3C:
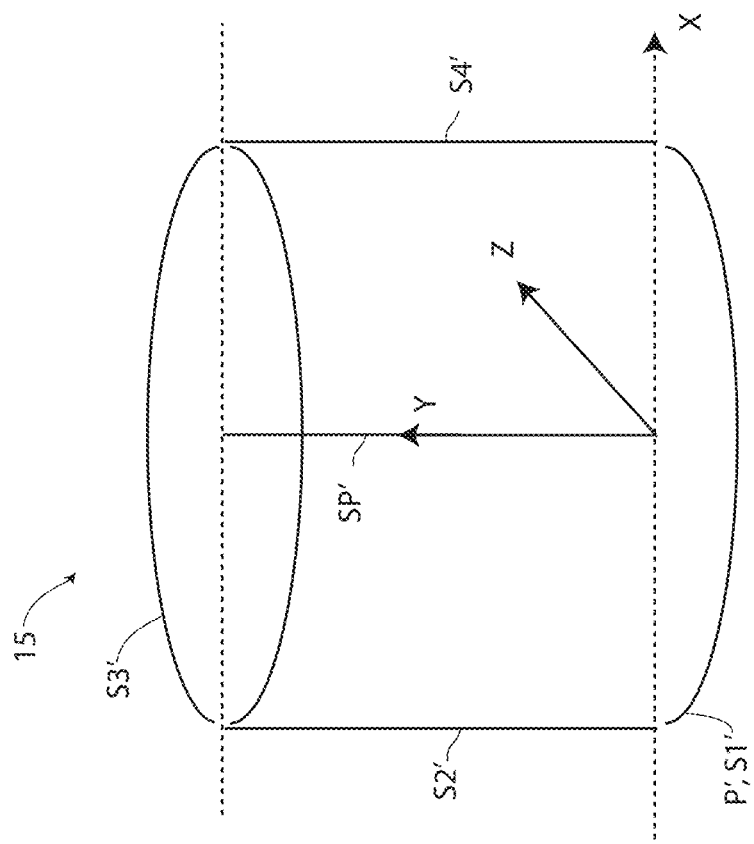
FIG. 3C shows curves the may be identified from FIG. 2B.
Figure 3B:
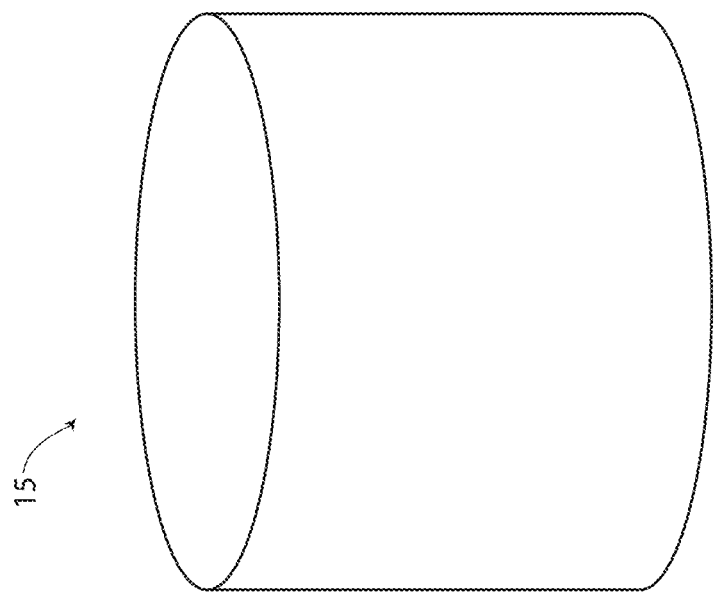
FIG. 3B is a view of an example of an image provided on a display.

FIG. 3B is a view of an example of an image 15 provided on display 215, and FIG. 3C shows curves the may be identified from FIG. 2B.

FIG. 3A shows image 15 located at some distance in front eye 101, and a scene SC in which a corresponding 3-D surface 115 will be projected. As noted above, various embodiments are directed at determining the shape and location of a 3-D surface 115 in scene S that will appear to eye 101 as being the same as image 15.

As shown in FIG. 3A, rays may be traced away from eye 101. Rays 102 skirt the edge of any images 15 within focal plane 5 and extend into scene. A specific ray 104 is shown passing through image 15 and extending to 3-D surface 115. Certain embodiments trace such rays from eye 101, through image 15, to 3-D surface 115, as described subsequently. Thus, for example, a ray 104 illustratively shows a point of image 15 projected to a point 123 on surface 115.

One method of constructing surface 115 from image 15 includes analyzing the image, by computer, by a user, or some combination thereof, to determine certain curves or curve segments in the image. The curves or curve segments include, at least, end points, and may include additional midpoints. One example of image 15 is shown in FIG. 3B, which may be, for example, a view looking slightly downwards on a cylinder. As shown in FIG. 3C, the outline, or silhouette, of image 15 includes several silhouette segments S1', S2', S3', and S4' which together form the silhouette of the image. One way of viewing these segments is that silhouette segments S2' and S4' are edges of an object (such as object 10), that silhouette segment S3' is a portion of the back of the object, and that silhouette segment S1' is a forward facing edge, also denoted as profile P'.

One method of constructing 3-D surface 115 is to define a spine SP' within image 15 as being between the edges (that is, between silhouette segments S2' and S4'), and to then project the spine as a 3-D spine SP which, as shown in FIG. 3A, is parallel to the Y axis, in plane 121 that is perpendicular to the Z axis. Silhouette segments S2' and S4' are also projected onto plane 121 as silhouette segments S2 and S4, respectively. The depth of surface 115 is provided by projecting profile P' onto a plane that is perpendicular to plane 121, that is, for example, in a X, Z plane as shown in FIG. 3A. As is further shown in FIG. 3A, the 3-D profile, P, extends between silhouette segments S2 and S4 in plane 121, and extends in the Z direction towards eye 101. In certain embodiments, profile P is then projected and moved along spine SP with profile P in a plane perpendicular to the spine.

In certain embodiments, some or all of silhouette segments, such a silhouette segments S1', S2', S3', and S4', profile P', and/or spine SP' are identified by a user by selecting one or more points, such as end points and optionally midpoints, from an image 15 on display 215 using input devices 213. In other embodiments, computer system 210 is programmed to identify line segments on image 15, and the user identifies one or more of silhouette segments S1', S2', S3', and S4', profile P', and/or spine SP' by pointing or selecting the segments, and may, optionally, select and move certain points to better define the segments. In certain other embodiments, the segments are selected according to programming of computers system 210 from an analysis of image 15.

The example given in the discussion of FIGS. 3A-3C has been simplified to illustrate the invention. In general, spine SP may be curved within a plane, may be in a plane that is angled towards image 15, or may be a three-dimensional curve; and the shape and/or length of profile P may change as it is swept along spine SP so that it extends from silhouette segments S2 to S4. Also, in general, one may not know the size of surface 115 or its distance from eye 101, and thus the location and size of surface 115 are known to within a scale factor. Alternatively, one may have enough information to determine the size or location of surface 115.

A user may input geometric information to computer system 210 via input devices 213 by providing prompted information including, but not limited to, typing in coordinates, adding or moving points using a mouse or other graphical input, by adjusting points that were previously selected by a user or by the computer system, or selecting certain pre-determined inputs from a pull-down menu. User-inputted geometric information may include, but is not limited to: entering or adjusting previously entered or computer determined corner points of a silhouette segment (that is, for example, the end points silhouette segment S1', S2', S3', or S4'; points of spine SP'; spine heading (pitch) angle of SP; and/or profile P'; responding to a computer system 210 prompt for the computer system to attempt to automatically determine a silhouette segment, spine, or profile, selecting a "primitive shape" for a profile P, including some commonly modeled cross-sectional shapes of the object being modeled, such as a box, a cylinder, or a pouch, which may then be used to generate a profile; instructing the computer to automatically generate profiles that are re-projected from the image; adjusting the shape of any line defined by a Bezier curve; or adjusting the shape by warping (editing over the 2D image).

Another type of user-inputted geometric information is a "warping sketched profile," which is a hybrid between generating an automatic profile and a sketched profile. User input adjusts the profile to modify a primitive profile shape. Thus, for example, an "L shaped" primitive is warped into a corner that has edges that do not meet at 90 degrees. One example of the sketched profile warping is further detailed in section below titled WARPING THE SKETCH TO MATCH OBJECT FEATURES.

In addition, computer system 210 may optionally be programmed to generate the 3-D model includes iteratively by repeating the steps of generating the 3-D model, accepting user input of geometric information and then displaying the 3-D model on the display, such that the user provides user input to produce an acceptable 3-D model on the display.

The following is a more detailed discussion of certain embodiments of the present invention as performed by computer system 210. In this discussion, the task of retexturing is considered, which is the process of realistically replacing the texture of an object in an image. The user provides a regular 2-D image along with an alternative texture, and the object's visible 3-D geometry is coarsely modeled. A parameterization implicitly maintained throughout the modeling process induces a warp that fits the texture on the desired object.

The following discussion describes the inventive construction of 3-D surfaces from 2-D images for extrusion surfaces. In certain embodiments, this requires the user to identify geometrical features in the 2-D image, and entering optional real-world measurements, as by the input devices 213.

The method includes defining an extrusion spine in 3-D in the form of a line segment, and then defining the shape of key cross-sectional profiles along the spine. The profiles are then automatically scaled to fit the object's silhouette, sampled and connected to form a 3-D triangle mesh. This construction induces a natural parameterization with axes based on the spine direction and the profiles' arc-length parameter.

The method further includes outlining the silhouette of the object in image 15, which may be in form of a standard Bézier path made up of cubic Bézier curve segments.

The method further includes the user defining an extrusion spine by viewing image 15 on dragging a line segment between two image points. The initial spine defaults to be parallel to the plane of the image, and its heading can be adjusted either manually using a slider, or automatically by entering several real-world measurements of the object.

After this, the user defines key cross-sectional profile curves. This can be done either automatically by selecting a part of the silhouette that corresponds to a profile, or manually by sketching a profile by hand and setting several point-pairs correspondence between the sketch and the image. Point-pair correspondence points can also be defined by adding folds to the surface, where folds are defined as a pair of point-pairs that can be or are connected by a line, that automatically set correspondence and pair two sets of profile points to two pairs of 3-D mesh points. In some embodiments the folds are added visually (i.e. by dragging a line segment between two image points) and in others the folds are added based on relative or absolute horizontal or vertical positioning on a specified silhouette or mesh.

A mesh is automatically generated along with texture coordinates. For mesh generation, the profile curves are sampled at consistent arc-lengths, scaled to match the silhouette, interpolated in between the given key profile positions, and connected to form a triangle mesh. Every mesh vertex is parameterized in UV space (texture coordinates) by the corresponding profile's arc-length parameter (U) and position along the spine (V).

A silhouette can, in some embodiments, be also be used to refine and improve later retexturing such as: Using the silhouette to generate alpha channel masks for use in promoting pixel accurate matching during retexturing and rendering, using the silhouette to isolate regions of the image for rendering, using the silhouette to guide inpainting and outpainting.

During the whole process, we assume that, for an image obtained using a camera, that the camera's intrinsic parameters are known, or can be approximated.

Camera Model

As described above, certain embodiments use a mathematical transformation between what appears in a 2-D image and what is reconstructed in 3-D. In certain embodiments, this transformation occurs using a mathematical model of the optics of a camera (a "Camera Model").

The Camera Model provides the transformation of a 3-D point $p=(x, y, z)^T$ given in the camera's reference system to its corresponding 2-D image point $Q=(u, v)^T$ given in pixel coordinates. This transformation may be done using one of several methods, as described below, depending on the desired level of accuracy. In addition, it would be obvious to one skilled in the art that embodiments of the Camera Model may include other mathematical formulations and/or assumptions.

In one embodiment, the transformation of the Camera Model is an affine mapping defined by a matrix $C^{3\times 3}$, the output of which is given in homogenous coordinates $\tilde{Q}=(uw, vw, w)^T$. Projecting a 3-D point to pixel coordinates is done by calculating $$\tilde{Q} = CP, Q = \left(\frac{\tilde{Q}_1}{\tilde{Q}_3}, \frac{\tilde{Q}_2}{\tilde{Q}_3}\right).$$

Un-projecting a pixel to world coordinates (on the z=1 plane) is done via $$p = C^{-1}\begin{pmatrix}u\\v\\1\end{pmatrix}.$$

The camera is considered to be positioned at the origin of the world coordinate system, looking towards the positive z direction. The projection type utilized is perspective.

With reference to FIG. 2A, image 15 is located on the plane defined by z=1, referred to herein as image plane, and points on the image plane are referred to herein as image points.

For images obtained using digital cameras, camera information may be found in standard EXIF header. The EXIF standard specification v2.3, which can be found at http://www.cipa.jp/stf/documents/eDC-008-2012_E.pdf. An EXIF is, for example, common to popular image formats like JPEG, may contain the data necessary to build a basic approximation of the Camera Model. The information needed for this is the camera's lens focal length and physical sensor size.

As one example of a Camera Model, which is not meant to limit the scope of the present invention, the Camera Model may be developed, from EXIF data using the following assumptions:

1. The projection is perfectly linear, meaning no distortions are present (i.e. barrel distortion).
2. The center of projection ($c_x$, $c_y$) lies exactly at the center of the image $$\left(\frac{W_I}{2}, \frac{H_I}{2}\right).$$

3. No skew is present.
4. Every pixel's aspect ratio is 1:1.
5. The lens focal length f, physical sensor size $W_S \times H_S$ and image dimensions in pixels are $W_I \times H_I$ are known.
6. Effective sensor size $W_{\bar{S}} \times H_{\bar{S}}$ is the size that covers as much as possible of the physical sensor, constrained by the image aspect ratio in pixels. More precisely, $W_{\bar{S}} \leq W_S$ and $H_{\bar{S}} \leq H_S$, with equality for at least one of the weak inequalities, and $$R \triangleq \frac{W_I}{W_{\bar{S}}} = \frac{H_I}{H_{\bar{S}}}.$$

Setting the image plane at z=f produces a perspective projection that transforms p to $$p' = \left(x\frac{f}{z}, y\frac{f}{z}, f\right).$$

From this, we compute the final transformation $$u = c_x + p'_x \frac{W_I}{W_{\bar{S}}} = \frac{W_I}{2} + x\frac{f}{z}R, \text{ and}$$

$$v = c_y + p'_y \frac{H_I}{H_{\bar{S}}} = \frac{H_I}{2} + y\frac{f}{z}R,$$

which may be written in matrix form in homogenous coordinates as $$\begin{pmatrix}wu\\wv\\w\end{pmatrix} = \begin{pmatrix}f\frac{W_I}{W_{\bar{S}}} & 0 & c_x\\0 & f\frac{H_I}{H_{\bar{S}}} & c_y\\0 & 0 & 1\end{pmatrix}\begin{pmatrix}x\\y\\z\end{pmatrix} = \begin{pmatrix}fR & 0 & \frac{W_I}{2}\\0 & fR & \frac{H_I}{2}\\0 & 0 & 1\end{pmatrix}\begin{pmatrix}x\\y\\z\end{pmatrix}.$$

A Camera Model developed from EXIF data may produce distorted images, and it may be desirable to allow a user the user make corrections. To keep this as simple as possible, a single parameter can be altered the angle of view (or FOV, field of view). The diagonal FOV can be calculated as $$\theta = 2\operatorname{atan}\left(\frac{1}{2f}\sqrt{W_{\bar{S}}^2 + H_{\bar{S}}^2}\right) = 2\operatorname{atan}\left(\frac{1}{2fR}\sqrt{W_I^2 + H_I^2}\right).$$

After the user sets its value, the only parameter that changes in the projection matrix is fR $$fR = \frac{\sqrt{W_I^2 + H_I^2}}{2\tan\frac{\theta}{2}}.$$

Optionally, a potentially more accurate Camera Model can be achieved by not including assumptions 2, 4 and 6 above, that is by not assuming: that the center of projection ($c_x$, $c_y$) lies exactly at the center of the image $$\left(\frac{W_I}{2}, \frac{H_I}{2}\right);$$

that every pixel's aspect ratio is 1:1; and that the effective sensor size $W_{\bar{S}} \times H_{\bar{S}}$ is the size that covers as much as possible of the physical sensor, constrained by the image aspect ratio in pixels. With these assumptions removed, the projection matrix, which was $f_x = f_y = fR$, becomes $$\begin{pmatrix}wu\\wv\\w\end{pmatrix} = \begin{pmatrix}f_x & 0 & c_x\\0 & f_y & c_y\\0 & 0 & 1\end{pmatrix}\begin{pmatrix}x\\y\\z\end{pmatrix}.$$

The parameters $f_x$, $f_y$, $c_x$, $c_y$ may be estimated using a standard calibration procedure, from calibration images taken beforehand. An example of a software library that does this from one or more images containing a known pattern (e.g. checkerboard) is OpenCV (see Http://docs.opencv.org/doc/tutorials/calib3-D/camera_calibration/camera_calibration.html), which can also compensate for non-linear distortion like barrel/fish-eye.

Projection and Re-Projection

Given a Camera Model, including but not limited to a Camera Model described above, equations for transforming between a 2-D image, such as image 15 into 3-D space, and a 3-D surface, such as 3-D surface 115, may be calculated. Transforms between the 3-D surface and the 2-D image are referred to herein as "projection," and the reverse transformation, between the 2-D image on the image plane and a 3-D surface at another plane are referred to herein as "re-projection." The following embodiments of projection and re-projection are provided as examples, and are not meant to limit the scope of the present invention.

Re-projection is thus a method of matching an image point p to a 3-D surface position $\Psi_{n,q_0}(p)$, which is known to reside on a plane which is orthogonal to a vector n and contains a point $q_0$. The intersection point q of the ray that starts at the origin (camera position) and goes through p with the given plane. If such a point exists, there exists a scalar t such that tp=q and (q−q$_0$) n=0, which is given by the following equations $$(tp - q_0) \cdot n = 0,$$

$$t = \frac{q_0 \cdot n}{p \cdot n},$$

$$q = \frac{q_0 \cdot n}{p \cdot n} p = \frac{q_0 \cdot \hat{n}}{\hat{p} \cdot \hat{n}} \hat{p}, \text{ and } \hat{x} \triangleq \frac{x}{\|x\|}.$$

When $\hat{p} \cdot \hat{n}$ is close to 0, the calculation may become numerically unstable, as a small change in p can cause a large change in q. This becomes even more evident when p is selected coarsely by the user. To overcome this, for small $\hat{p} \cdot \hat{n}$ the method forces q closer to the plane $z=q_0^z$. Doing so ensures selection stability, at the cost of allowing $\Psi_{n,q_0}(p)$ not to project exactly on p and losing control over its depth. The inventors have found that the produces useful results in in many cases.

More formally, the method searches for the nearest point q' on the intersection line $l_1(t_1)$ between the (n, $q_0$) and the $z=q_0^z$ planes to the viewing ray $l_2(t_2)$. The final re-projection result is then defined as a weighted average of q and q'

$$l_1(t_1) \triangleq q_0 + t_1(n \times e_z), e_z = (0,0,1)^T, \text{ and}$$

$$l_2(t_2) \triangleq t_2 p.$$

The squared distance between two points on these lines is $$d(t_1,t_2) \triangleq \|l_1(t_1) - l_2(t_2)\|^2 = \|q_0 + t_1(n \times e_z) - t_2 p\|^2 = (q_0 + t_1(n \times e_z) - t_2 p)^T(q_0 + t_1(n \times e_z) - t_2 p),$$

where the nearest point d's derivatives are zero:

$$\begin{cases} 0 = \dfrac{\partial d}{\partial t_1} = 2t_1 \|n \times e_z\|^2 + 2(n \times e_z)^T q_0 - 2t_2(n \times e_z)^T p \\ 0 = \dfrac{\partial d}{\partial t_2} = -2q_0^T p - 2t_1(n \times e_z)^T p + 2t_2 \|p\|^2 \end{cases}$$

Solving for $t_1$ gives $$t_1 = \frac{(n \times e_z)^T p p^T q_0 - \|p\|^2 (n \times e_z)^T q_0}{\|n \times e_z\|^2 \|p\|^2 - ((n \times e_z)^T p)^2},$$

and $$q' = l_1(t_1) = q_0 + t_1(n \times e_z),$$

and the re-projection is $$\Psi_{n,q_0}(p) = \alpha(\hat{p} \cdot \hat{n}) q + (1 - \alpha(\hat{p} \cdot \hat{n})) q',$$

where $\alpha(p)$ is the following smooth threshold function $$\alpha(x) = \frac{1}{1 + \left(\frac{0.1}{|x|}\right)^6}.$$

3-D Spine

Figure 4:
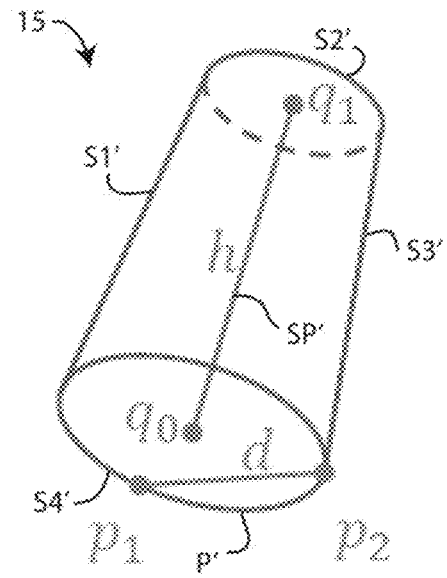
FIG. 4 illustrates definitions of spine as a line segment connecting two points $q_0$, $q_1$, which are the projections of the 3-D spine SP onto an image.
Figure 5:
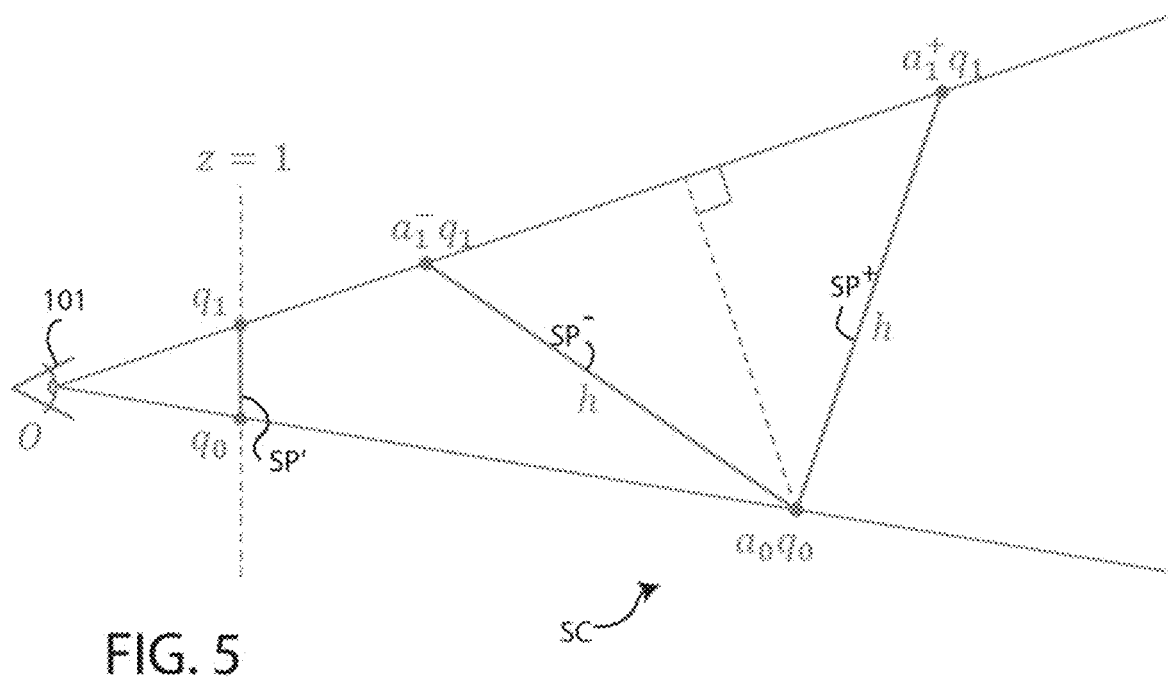
FIG. 5 illustrates the re-projection of spine SP' to 3-D spine SP.

FIG. 4 illustrates definitions of spine, SP', as a line segments connecting two points $q_0$, $q_1$, which are the projections of the 3-D spine SP onto image 15, and which thus reside in the image plane (z=1). FIG. 5 illustrates the re-projection of spine SP' to 3-D spine SP. Spine SP' may be defined, for example, by the user selecting points of the spine, including the end points, as described above. The following embodiments of methods and systems for defining spine SP and 3-D spine provided as examples, and are not meant to limit the scope of the present invention.

In addition to the contour of the spine, a heading direction associated with 3-D spine SP may be automatically adjusted by computer system 210 by having the user, through input devices 213, enter additional measurements:

Spine length h.

Two image points $p_1$, $p_2$ which are the projections of two 3-D points that lie on the spine's base plane, i.e. the plane orthogonal to the spine that contains the spine's base point.

Desired distance d between these two points.

To do this, we minimize the target function $$E(a_0,a_1) = (\|\Psi_{n,a_0 q_0}(p_1) - \Psi_{n,a_0 q_0}(p_2)\| - d)^2,$$

where $n = a_1 q_1 - a_0 q_0$, constrained by $$\|a_0 q_0 - a_1 q_1\| = h, \text{ and } \frac{a_0 q_0 \cdot n}{p_i \cdot n} p_i$$

is the re-projection of $p_i$ on the plane orthogonal to the spine (n) containing the spine's base point $a_0 q_0$, and E is the square difference between the requested distance and the actual distance.

The constraint can be simplified in a manner similar to what is described in Perriollat, Mathieu, Richard Hartley, and Adrien Bartoli. "Monocular Template-Based Reconstruction of Inextensible Surfaces." *International journal of computer vision* 95.2 (2011): 124-37, by solving the quadratic equation $$h^2 = (a_0 q_0 - a_1 q_1)^T (a_0 q_0 - a_1 q_i) = a_0^2 q_0^T q_0 - 2 a_0 a_1 q_0^T q_1 + a_1^2 q_1^T q_1$$

$$a_1 = \frac{a_0 q_0^T q_1 \pm \sqrt{(a_0 q_0^T q_1)^2 - q_1^T q_1 (a_0^2 q_0^T q_0 - h^2)}}{q_1^T q_1}$$

and boundaries on $a_0$ can be imposed by limiting $a_0 > 0$ and satisfying the inequality $$(a_0 q_0^T q_1)^2 - q_1^T q_1 (a_0^2 q_0^T q_0 - h^2) \geq 0$$

$$a_0 \leq \sqrt{\frac{h^2}{q_0^T q_0 - \frac{(q_0^T q_1)^2}{q_1^T q_1}}} \triangleq a_{max}.$$

By setting $a_0$ to a value in the range [0, $a_{max}$], we get up to two possible solutions for $a_1$ and thus E. These two solutions correspond to a spine that faces towards the origin and away from the origin, and the user can choose between them, yielding a unique solution for $a_1$ given $a_0$.

E ($a_0$) is not guaranteed to be convex, and thus gradient descent based optimization methods may not be stable. In this case, may possibilities can be examined to achieve acceptable results in a very short time.

Profiles

The profile P can be defined by identifying its projection, P' in an image. The following embodiments of defining profile P and its projection P' are provided as examples, and are not meant to limit the scope of the present invention.

In certain embodiments, P' is a segment of the object's silhouette. The profile P' is then re-projected on a plane defined by a point on spine SP, and is moved in a direction along the spine to form 3-D surface 115.

Another way of defining a profile P' is for a user to manually draw or input the profile using input devices 213, or to provide geometric information, by, for example, selecting a primitive 2-D shape from a list provided by computer system 210 to the user, such as a square, a square with rounded corners, curved, etc., and are basically any open path, or identifying that the shape has an identical shape for all cross-sections, or provide some measurements of lengths or angles.

Examples of primitive 2-D shapes include, but are not limited to, a half-circle, a half-square, and L shape, or defining Bezier curve. The user may thus define a transformation from 2-D to 3-D using 2 correspondence points and a convex/concave flag, which may be another selection provided by computer system 210 for the user to make.

The 3-D profile, P, may, for example and without limitation, be generated by:
1. Defining two sketch points $p_1=(p_1^x \ p_1^y)^T$, $p_2=(p_2^x \ p_2^y)^T$.
2. Determining two corresponding image points $q'_1=(q'^x_1 \ q'^y_1)^T$, $q'_2=(q'^x_2 \ q'^y_2 \ 1)^T$.
3. Defining a profile plane, given by a normal vector n (in the spine direction) and a spine point $q_0$.
4. Defining a flipping flag, to select the profile side that faces the user.

Thus, we seek a transformation M that:
1. Maps $p_1$, $p_2$ to 3-D points $q_1$, $q_2$ that
   a. Lie in the profile plane.
   b. Are projected by the camera to $q'_1$, $q'_2$.
2. Flips the 3-D curve according to the given flag.
3. Is a similarity transformation.

In this method, first, set $q_i = \Psi_{n,q_0}(q'_i)$ for $i \in \{1,2\}$. This ensures that $q_1$, $q_2$ lie in the profile plane, but in cases where the viewing ray is nearly orthogonal to the spine the projection will only come near $q'_1$, $q'_2$. In such case manual adjustment can be made to the depth (z) value of these points.

In order for M to be a similarity transformation, it needs to map the vector v as defined below, which is orthogonal to $(p_2-p_1)$ in the sketch plane, to one of the vectors $\pm w$, which is orthogonal to $(q_2-q_1)$ in the profile plane. The choice between + and − is made according to the flipping flag. We further relate to sketch points as 3-D points in the z=0 plane.

$$v=(p_2-p_1)\times(0\ 0\ 1)^T=((p_2^y-p_1^y)-(p_2^x-p_1^x)0)^T w=(q_2-q_1)\times n.$$

Also, the vector $(0\ 0\ 1)^T$ in the sketch coordinate system need to be mapped to n in 3-D.

Summing up all constraints on M in matrix form, with columns consisting of points and vectors given in 3-D homogenous coordinates, we get:

$$M \underbrace{\begin{pmatrix} p_1^x & p_2^x & v_x & 0 \\ p_1^y & p_2^y & v_y & 0 \\ 0 & 0 & 0 & 1 \\ 1 & 1 & 0 & 0 \end{pmatrix}}_{A} = \underbrace{\begin{pmatrix} q_1^x & q_2^x & \pm w_x & \pm n_x \\ q_1^y & q_2^y & \pm w_y & \pm n_y \\ q_1^z & q_2^z & \pm w_z & \pm n_z \\ 1 & 1 & 0 & 0 \end{pmatrix}}_{B}$$

A solution is obtained by inverting A:

$$M=BA^{-1}.$$

To apply M to a sketch point $p=(P_x\ P_y)^T$, it should be written as $(p_x\ p_y\ 0\ 1)^T$, and the result is a 3-D point in homogenous coordinates. The $3^{rd}$ column of M has no effect and can be removed for better efficiency.

Denoting the spine point $q_0$ projection on the image plane q, and the direction of the 2-D spine projection n', a default correspondence can be defined by finding the intersection points of the object's silhouette with the line in the image plane that is perpendicular to n' and passes at $q'_0$. This line can be defined as $$l(t)=q'_0+tv, v=(n'_y,-n'_x,0)^T.$$

The intersections of the above defined line with the silhouette can then be calculated numerically by sampling the silhouette curve and iterating all sample points to find the ones near enough to the perpendicular line to be considered intersections.

If two intersection points $l(t_1)$, $l(t_2)$ are encountered, one on each side of the spine projection, the default transformation is then defined by setting $p_1$, $p_2$ to the sketch edge points (ordered arbitrarily), and $q'_i=l(t_i)$. The flipping flag is set arbitrarily.

Warping the Sketch to Match Object Features

In some situations, it is desired that more than just two sketch points fit exact locations in the image. This may be accomplished, for example, by first defining a sketch transformation using two point pairs as described above, and then warping the sketch itself to match additional correspondence points. The following embodiments of warping are provided as examples, and are not meant to limit the scope of the present invention.

Let s(p) be the arc-length of a point p along the 2-D sketch curve. Given:
1. A sketch transformation M.
2. A list of n≥2 sketch points $p_i$ for i=1 ... n, that are mapped to 3-D points $q_i=Mp_i$, sorted by ascending arc-length. For $i_1>i_2$, $s(p_{i_1}) \geq s(p_{i_2})$.
3. A new desired position $\tilde{q}_k$ to replace $q_k$ for a single $k^{th}$ point.

Introduce a continuous mapping $\omega(p)$ that will warp the sketch curve so that $\omega(p_i)=p_i$ for $i \neq k$, and $\omega(p_k)=\tilde{p}_k$, where $\tilde{p}_k=M^{-1}\tilde{q}_k$. For 1<k<n, define $\omega(p)$ as follows:

$$\omega(p) = \begin{cases} p & s(p) < s(p_{k-1}) \text{ or } s(p) \geq s(p_{k+1}) \\ M^{-1}M_l p & s(p_{k-1}) \leq s(p) < s(p_k) \\ M^{-1}M_r p & s(p_k) \leq s(p) < s(p_{k+1}) \end{cases}.$$

Where $M_l$ is the sketch transformation matrix defined by $p_{k-1}$, $\tilde{p}_k$ and $q_{k-1}$, $\tilde{q}_k$, and $M_r$ is the sketch transformation matrix defined by $p_{k+1}$, $\tilde{p}_k$ and $q_{k+1}$, $\tilde{q}_k$.

For k=1 we define $$\omega(p) = \begin{cases} p & s(p) \geq s(p_{k+1}) \\ M^{-1}M_r p & o.w. \end{cases},$$

and for k=n we define $$\omega(p) = \begin{cases} p & s(p) < s(p_{k-1}) \\ M^{-1}M_l p & o.w. \end{cases}.$$

Profile Interpolation

New sketched profiles can be nearly seamlessly created by interpolating adjacent profiles using profiles defined using Bézier paths, composited of piecewise-cubic Bézier curves. To interpolate two Bézier paths, they should have the same amount of anchor points, preferably at similar arc-length positions. To this end, computer system 210 is programmed to iteratively add anchors to any of the paths until there are anchors in the same normalized arc-length positions in both curves. This iteration may be done using known algorithms that insert an anchor in the middle of a Bezier curve without changing its geometry. After that, the curves can be linearly interpolated, by averaging their anchor and control points, weighted by a distance measure of the new path from the original ones. This distance measure was chosen to be the distance between the cross-section planes along the spine. An interpolated profile normally acts as a starting point for a manual profile sketch.

Mesh Generation

Spine SP and profiles P are next used to generate a 3-D triangle mesh, which may be used to define 3-D surface 115. The mesh is stored in computer system 210 as an indexes face set. The following embodiments mesh generation are provided as examples, and are not meant to limit the scope of the present invention.

Computer system 210 is programmed to accept user input, which may be, for example, the setting of lower bounds on $n_u$ and $n_v$ ("minimal mesh resolution"), of a list $\check{S}=(\check{s}_1, \ldots, \check{s}_{n_u})$ of sorted normalized arc-length values at which the profiles' points are sampled, and another list of sorted spine positions $\check{T}=(\check{t}_1, \ldots, \check{t}_{n_v})$ that signify cross-sections to which the profiles are interpolated. All $\check{s}_i$ and $\check{t}_i$ values are in the [0 . . . 1] range.

Letting $T=(t_1, \ldots, t_{n_p})$ be the positions along the spine of the user-defined profiles, the method includes the following steps:
1. Reverse the profiles that need to be reversed.
2. Sample all profiles at normalized arc-lengths defined by $\check{S}$.
3. Interpolate the sampled profiles to spine positions defined by $\check{T}$.
4. Generate a 3-D triangle mesh that connects matching samples in subsequent cross-sections.
5. Scale each cross-section to fit the silhouette curve.
6. Stretch in the spine direction to fit the silhouette curve.

Every profile is sampled at exactly $n_u$ points. We linearly interpolate matching points between adjacent profiles to obtain a smooth transition for cross-sections defined by $\check{T}$. More formally, given two points in adjacent profiles $p_j^i, p_j^{i+1}$ where $1 \le i < n_p$ and $1 \le j \le n_u$, and a spine position $\check{t}_k \in \check{T}$ such that $t_i \le \check{t}_k \le t_{i+1}$, the interpolated point is $$\check{p}_j^k = \frac{\check{t}_k - t_i}{t_{i+1} - t_i} p_j^{i+1} + \frac{t_{i+1} - \check{t}_k}{t_{i+1} - t_i} p_j^i.$$

The mesh is generated by connecting point $\check{p}_j^k$ with its neighbors in a 4-connected manner if j+k is odd, and in an 8-connected manner if it is even.

Profile Curve Direction Reversal

The arc-length parameter of a curve can be defined starting at one of its two endpoints. It is desirable that the ordering of these endpoints remain consistent across all profiles. To ensure this, we connect the 2-D projections of the endpoints each profile and the first profile with two line segments. If the segments intersect, we infer that the direction of the profile is reversed, and correct it accordingly.

In certain embodiments, computer system 210 is programmed to automatically scale the cross-sections. At each cross-section, the profile, P, is scaled around the spine, SP, so that its projection exactly fits the silhouette.

Normally the silhouette covers both sides of the spine, so two scale values $\sigma_l, \sigma_r$ need to be calculated. These values correspond to points $\check{p}_1, \check{p}_{n_u}$ respectively. Each point along the profile is then scaled by an average of these values, weighted by the point's arc-length. Point $\check{p}_j$ is transformed to $\sigma(\check{p}_j)$ as follows:

$$\sigma(\check{p}_j) = q_0 + ((1-\hat{s}_j)\sigma_l + \hat{s}_j \sigma_r)(\check{p}_j - q_0)$$

Where $q_0$ is the spine point of the relevant cross-section and is the normalized arc-length of $\check{p}_j$, meaning that $\hat{s}_1 = 0$ and $\hat{s}_{n_u} = 1$.

The calculation of $\sigma_l$ and $\sigma_r$ may be done in one for two ways:
1. In 3-D—The silhouette is un-projected on the cross-section plane. Two rays are sent from $q_0$ through each of the profile curve's edge points $\check{p}_1, \check{p}_{n_u}$, and intersection points $\check{q}_1, \check{q}_{n_u}$ of the rays with the un-projected silhouette are found (There is normally exactly one intersection point per ray). We set $$\sigma_l = \frac{\|\check{q}_1 - q_0\|}{\|\check{p}_1 - q_0\|} \text{ and } \sigma_r = \frac{\|\check{q}_{n_u} - q_0\|}{\|\check{p}_{n_u} - q_0\|}.$$

2. In the image plane—The profile curve's edge points are projected to $\check{p}'_1, \check{p}'_{n_u}$ and $q_0$ is projected to $q'_0$. Two rays are sent from $q'_0$ through each of the points $\check{p}'_1, \check{p}'_{n_u}$ and intersection points $\check{q}'_1, \check{q}'_{n_u}$ of the rays with the un-projected silhouette are found. We set $$\sigma_l = \frac{\|\check{q}'_1 - q'_0\|}{\|\check{p}'_1 - q'_0\|} \text{ and } \sigma_r = \frac{\|\check{q}'_{n_u} - q'_0\|}{\|\check{p}'_{n_u} - q'_0\|}.$$

It is preferable to calculate $\sigma_l, \sigma_r$ in 3-D, as distance ratios between points aren't normally preserved upon projection. Also, accurate re-projection becomes difficult when the spine is nearly orthogonal to the viewing ray, thus is such case the second method is chosen.

In certain other embodiments, computer system 210 is programmed to automatically stretch in the spine direction. Thus, it is possible to deform the shape of the profile P in a direction parallel to spine SP, in order to fit it to the silhouette. Let $l(t) = p + tv$ be the spine line segment and $l'(t) = p' + tv'$ its 2-D projection for $t \in [0 \ldots 1]$. For each index $j = 1 \ldots n_u$ of a profile sample, we find two scalars $\rho_b, \rho_t$ such that $p'_1 = \text{proj}(\check{p}_j^1) + \rho_b v'$ and $p'_{n_v} = \text{proj}(\check{p}_j^{n_v}) + \rho_t v'$ lie on the 2-D silhouette, with the smallest possible values for $|\rho_b|$ and $|\rho_t|$. In other words, $p'_1$ and $p'_{n_v}$ are the intersection points of l'(t) with the silhouette, nearest to the image projections of $\check{p}_j^1$ and $\check{p}_j^{n_v}$ respectively. The points $\check{p}_j^k$ with $k=1 \ldots n_v$ are transformed to $\rho(\check{p}_j^k)$ as follows:

$$\rho(\check{p}_j^k) = \check{p}_j^k + ((1-\check{t}_k)\rho_b + \check{t}_k \rho_t)v.$$

Parameterization

The mesh discussed above may be parameterized for texturing by the normalized spine position $\hat{t}(\check{p}_j^k)$ (v axis) and by the normalized profile arc-length $\hat{s}(\check{p}_j^k)$ (u axis). An additional parameter $\lambda_u$ can influence the extent to which the scaling factors $\sigma_l, \sigma^r$ affect scaling in the parameterization domain in u direction.

$$u_j^k = (0.5 - \hat{s}(\check{p}_j^k)(\lambda_u((1-\hat{s})\sigma_l + \hat{s}(\check{p}_j^k)\sigma_r) + (1-\lambda_u))L_k$$

$$v_j^k = 1 - \hat{t}(\check{p}_j^k)$$

$(0.5-\hat{s}(\check{p}_j^k))$ is the reverse profile arc-length centered around 0.5. It is multiplied by the extent to which the u coordinate should be scaled, which is a weighted average of 1 and $((1-\hat{s}(\check{p}_j^k))\sigma_l+\hat{s}(\check{p}_j^k)\sigma_r)$. The latter is itself a weighted average of the length of $\sigma_l$ and $\sigma_r$, and $L_k$ is the total length of the $k^{th}$ profile before scaling.

After calculating the coordinates of all points, they are normalized to the range [0 . . . 1]. $\lambda_u=1$ yields zero area distortion, whereas $\lambda_u=0$ yields zero angular distortion (see 0).

Deformation Evaluation

The texture deformation may be determined, for example and without limitation, in a manner similar to the method describe in Sander, Pedro V., et al. "Texture Mapping Progressive Meshes". *Proceedings of the 28th annual conference on Computer graphics and interactive techniques.* ACM, 2001. 409-416. Given a triangle with 2-D texture coordinates $p_1$, $p_2$, $p_3$ where $p_i=(u_i, v_i)$ and corresponding 3-D coordinates $q_1$, $q_2$, $q_3$, there exists a unique affine mapping $S(p)=S(u,v)=q$ defined as:

$$S(p) = \frac{\langle p, p_2, p_3 \rangle q_1 + \langle p, p_3, p_1 \rangle q_2 + \langle p, p_1, p_2 \rangle q_3}{\langle p_1, p_2, p_3 \rangle}.$$

With the partial derivatives:

$$S_u = \frac{\partial S}{\partial u} = \frac{(v_2 - v_3)q_1 + (v_3 - v_1)q_2 + (v_1 - v_2)q_3}{2\langle p_1, p_2, p_3 \rangle}$$

$$S_v = \frac{\partial S}{\partial v} = \frac{(u_2 - u_3)q_1 + (u_3 - u_1)q_2 + (u_1 - u_2)q_3}{2\langle p_1, p_2, p_3 \rangle}$$

Where $\langle p_1, p_2, p_3 \rangle = \frac{1}{2}((u_2-u_1)(v_3-v_1)-(u_3-u_1)(v_2-v_1))$ is the area of triangle $p_1$, $p_2$, $p_3$. The singular values of the 3×2 Jacobian matrix $[S_u, S_v]$ are:

$$\gamma_{max} = \sqrt{\frac{1}{2}\left(a + c + \sqrt{(a-c)^2 + 4b^2}\right)}$$

$$\gamma_{min} = \sqrt{\frac{1}{2}\left(a + c - \sqrt{(a-c)^2 + 4b^2}\right)}.$$

Where $a=S_u \cdot S_u$, $b=S_u \cdot S_v$, $c=S_v \cdot S_v$.

The values $\gamma_{max}$, $\gamma_{min}$ represent the largest and smallest possible scaling caused to a unit length in the parameterization domain by the mapping S. Computer system 210 may be programmed to evaluate local distortion using heat-maps that represent the $L^2$ metric, which is the root-mean-square length distortion:

$$L^2(p_1, p_2, p_3) = \sqrt{\frac{\gamma_{max}^2 + \gamma_{min}^2}{2}} = \sqrt{\frac{a+c}{2}}$$

and an angle deformation metric $L^\angle$, which is the cosine of the angle between vectors $S_u$, $S_v$:

$$L^\angle(p_1, p_2, p_3) = \frac{S_u \cdot S_v}{\|S_u\|\|S_v\|}$$

The heat-maps so defined may then be presented on display 215 for evaluation by the user.

Examples of using 3-D Models to Manipulate Image Data

Figure 6:
FIG. 6 illustrates some results, showing several original images, checkerboard pattern on reconstructed surfaces of the images, and the retextured surface.

Embodiments of the 3-D model, as described above, may be used in a variety of ways to facilitate the production of artwork. Thus, for example, the methods and systems described above, allow an artist to work on a 2-D image of a 3-D object defined by a 3-D model, while computer system 210 determines the 3-D form by re-projecting the 2-D image onto the 3-D model of the object, applies artwork or modifies the surface of the 3-D model, and then projects the modified 3-D model onto the 2-D image on which the artist is working. In this way, the user can manipulate the image as if painting, editing or drawing on the 3D object itself. FIG. 6 illustrates some results using the above methods or systems, showing several original images, checkerboard pattern on reconstructed surfaces of the images, and the retextured surface.

The following examples illustrate embodiments in which the inventive 3-D model may be used within image manipulation software. Thus, for example, prior art image manipulation software, including but not limited to PHOTOSHOP™, may be modified by one skilled in the art to generate and/or use the inventive 3-D model.

In one embodiment, certain embodiments described above are incorporated in image manipulation software, which may be for example and without limitation, PHOTOSHOP™, to allow a user to interact more directly with objects or pixels within the object corresponding to the 3-D model. Thus, as current versions of PHOTOSHOP™ allow users to select pixels using a "lasso tool," use of the lasso tool may, in one embodiment, be modified by the 3D model so that, for example, dragging the lasso to make a selection along a horizontal would, given that the 3D geometry supports it, move the lasso along a curved line.

With the addition of a light source, as within PHOTOSHOP™, for example, the tool's resulting geometry may be used to re-light/shade portions of the 2-D image by using the rendered 3-D output to make a range of adjustments to the 2-D pixels.

Using the 3D model in combination with some simple surface shading (for example: even something as simple as phong or flat shading) and a simple light source, a rendering of the 3D surface could be produced that would visually represent the 3-D topology in 2-D. The 2-D output from the rendering, in the form of standard RGBA pixels, would then be used to compute new pixel values for the any image data that is combined with this new pixel data.

In another embodiment, a user-controlled paintbrush=type tool, such as that found in PHOTOSHOP™, may be used to composite the rendered pixel data with the current underlying pixel data at the location of the paintbrush and any number of transforms could be done based on the values represented by the rendering pixel data.

Thus, while image manipulation software such as PHOTOSHOP™ provide composited pixels using the paint brush might only include the paint data (for example a solid RGBA color mix) and the original image data, with the rendered shading/lighting data from the 3-D model, present embodiment of data include the paint RGBA value, the original image data and the shading and lighting data. In this way, when the user paints with the brush, the painting values appear to be more realistically part of the scene because they have realistic shading/lighting data.

Thus, for example, if in one embodiment a value of a rendered pixel is representing (R,G,B,A) values, then each value could be used to adjust the values of the underlying pixels where the less intense each of the (R,G,B) rendered pixels the more the existing 2-D image pixels are lightened and shifted to a blue cast. The result could, in one embodiment, allow the user to quickly recolor the pixels in an image of an object or scene to make it look as if the lighting in the scene or object image had changed, essentially allowing the user to paint in new lighting.

The tool's resulting geometry may be used with ray tracing to test 3-D z-depth at a number of (x,y) points in the 2-D image.

The resulting depth values can, in one embodiment, be used with standard geometric calculations in order to support scientific analysis, for example to measure the distance in space between two points in the image, accounting for real-world depth.

When using image manipulation software such as PHOTOSHOP™ or specialized scientific analysis software, that may have previously supported 2-D distance measuring or some flat plane depth estimation using built-in measuring tools, application of the 3-D model in one embodiment of the invention would allow a user of similar software to use similar measuring techniques to measure curved surface depths and more complex depths calculations.

The resulting depth values can be used to adjust brush size in a paint program, such as PHOTOSHOP™, so that the user using the software is able to use a brush that is consistent with the subject matter being painted. Each resulting depth value can be combined with other scene values, such as field of view, to determine a final value and this value can be used to set brush size.

In one embodiment, the user uses a brush tool similar to those that exist in other image manipulation software, such as PHOTOSHOP™. However, with the addition of the 3-D model calculations, as described herein, the brush maintains a size that is consistent with the surface in the image that is being affected during any kind of brush operation. In this way, the user is freed from having to continuously adjust the size of their brush as they make manipulations to different areas of the image.

The resulting depth values can be used by a software program to assist in the simulation of physics, such as direction of paint flow when a user manipulates the 2-D scene in a software application.

In this way, a user could paint objects and surfaces within a 2-D scene but have the paint react realistically to gravity and the surface topology. Painting operations would be similar, in one embodiment, to typical brush operations in image manipulation software such as Photoshop, so that the user would apply color values to various pixels in the scene. But with the assistance of the 3D geometry and the physics calculations derived from that geometry, pixel values would be modified to be applied in a way that would represent painting operations in the real world. Alternatively, these same physics calculations could be used in order to create new and unusual painting effects, such as the paint floating out away from the subject in the image, as if it was magnetically attracted to the user's brush.

The tool's resulting geometry may be used to set realistic blurring in the 2-D image by using the 3-D z-depth to set each pixel's blur amount based on the z-depth at that pixel's location (depth buffer value).

The resulting depth buffer values can be used to defocus or refocus objects and surfaces within a 2-D scene more accurately. Using the depth buffer value for a single pixel or group of pixels can be used to set the strength of a Gaussian transform as it is applied to that respective single pixel or group of pixels. Similarly, a de-blurring algorithm could be applied to a single pixel or group of pixels, based on the depth buffer values.

Blurring or de-blurring would be applied, in one embodiment, via a process similar to the way in which filters are applied in image manipulation software such as Photoshop. In one embodiment, the user would simply select a blur or de-blur value using a slider control and accept the result. The calculations would then be applied, resulting in changes to the original image that provide blurring or de-blurring that is mediated by the depth of the surfaces in the scene.

The tool's resulting geometry may be used to reverse project existing 2-D image data into a 2-D texture so that the size or shape of 2-D objects depicted in the 2-D image can we adjusted when copied or moved to new locations within the 2-D image.

Using a selection tool that, in one embodiment, works in a similar way to those of image manipulation software UI such as PHOTOSHOP™, the user can select a region of the 2-D image pixels. But using the 3-D model, the selection would follow the 3-D surface. After accepting the selection and then, in one embodiment, clicking a button to extract the selected pixels, the source pixels in the 2-D image are reversed projected, using a reverse projection algorithm, in order to map each pixel to a standard 2-D rectangular region/patch (the pixels may or may not fill the 2-D region depending on the topology of the 3-D surface). The resulting 2-D patch of pixels is then remapped to another location, based on the user's interaction, of the geometry. When this remapping occurs the 2-D patch is naturally reshaped by the new topology and size. Similar techniques can be used to estimate the sizes of various objects and surfaces within the 2-D image and the way in which the user interacts with the elements would be very similar to those in software applications such as PHOTOSHOP™. The tool's resulting geometry may be used to inpaint or outpaint portions of the 2-D image.

If the topology of an object or surface in a scene is known, then this topology may be used to assist in automatic inpainting or outpainting of the object or surface in the scene. For example: in one embodiment inpainting and outpainting can be used in order to help clean up the edge of an object against a background in a scene so that this edge is matched exactly with the edge of the 3-D model itself or to extend an edge out in order to provide a cleaner fit for masking or other retouching. First the user sets the edge within the region of the 3-D model. This can be done using 2-D vector paths, 3-D paths, 2-D masking, 2-D painting or any number of selection techniques that, in one embodiment, are similar to those in many image manipulation applications such as Photoshop. Once selection is complete the user, in one embodiment, is able to choose in the UI whether to inpaint or outpaint the region. To perform inpainting, pixels that neighbor the edge are copied and reverse projected as above. Then the pixels are relocated closer to (or beyond) the edge and used to replace the existing pixels that are visible at the new location. To perform outpainting, the same approach is used except that the source pixels are those that neighbor the geometry edge on the outside of the edge and those pixels are brought in closer, but still outside, the edge.

Other inpainting and outpainting may also be performed, such as replacement or approximation of the pixels that lie within the 3-D model.

The 3-D model can also be used in combination with the 2-D image to further refine the 3-D model itself by analyzing the 2-D image.

In one embodiment, the user would first select the 2-D region to be reverse projected. This can be done using 2-D vector paths, 3-D paths, 2-D masking, 2-D painting or any number of selection techniques that, in one embodiment, are similar to those in many image manipulation applications such as PHOTOSHOP™. Once selection is complete, 2-D pixel data can be reverse projected, as above, via the 3-D model. The reverse projected pixel data can then be used as the basis for lighting analysis. Using any of a number of approaches to analyze the light and shadow represented in the reverse projected pixel data, or the 2-D image data or a combination of the two (such as the differences between the two), the light source or light sources in the scene may be ascertained and then recreated in the 3-D scene by adding the light sources to the scene. The updated 3-D scene would be, in one embodiment, displayed to the user via the software's user interface. In another embodiment, the updated pixel data would be output directly to disk.

Additional refinements to the 3-D model itself may also be made, by using similar analysis to the lighting analysis where more detailed surface topologies are determined and then reapplied to the existing the 3-D model in order to further refine the structure of the geometry.

The refinement process can be repeated in order to progressively augment the quality and detail level of the 3-D model with or without user intervention.

The tool's resulting geometry may be used to represent the 2-D image as a 3-D scene that is rotatable or that may be observed in 3-D.

The user would, in one embodiment, use image manipulation software similar to PHOTOSHOP™, where they would use the software UI to designate and select regions that are to be made 3-D.

To build the 3-D scene from the 2-D image and the 3-D model, textures are created by reverse projecting pixels from the 2-D scene via the 3-D model and then applying the textures to the 3-D model. From the default viewing position, the visible pixels, as rendered onto the 3-D model will look nearly identical to the flat 2-D pixels in the scene in both position and color value. However, by translating the viewer's position or changing camera values, such as field of view, the user can change their viewing position. To compensate for previously occluded areas (i.e. hidden surfaces on the object/in the scene) inpainting techniques can be used to replace the missing pixel values. Selecting, applying and then viewing the results would, in one embodiment, take place in a single piece of image manipulation software with an interface that is similar to PHOTOSHOP™. In another embodiment, the user interface might be similar to that of 3-D authoring software.

The tool's resulting geometry may be used to modify or augment the 2-D image with procedurally rendered effects such as textures, bumps, reflections or transparency.

Unlike some of the previous applications, where geometry is combined with existing 2-D pixel data in order to achieve a number of graphic results, the 3-D model may also be rendered using these procedurally generated textures, bumps, reflections or transparency. The output from this procedurally generated data can then be combined with the existing 2-D image data to modify the original 2-D image.

In any of the above scenarios, the user would make selections, designations and choices to inform how the 3-D model is applied and rendered, as well as viewing or storing the results of these renderings via a UI or user interface that, in some embodiments, is similar to image manipulation software such as Photoshop where selection, painting, cloning and other retouching tools are available. In other embodiments, this interface might be more limited, and contain only tools that are specific to the application of the 3-D model. In other embodiments, the user might engage with the 3-D model using a UI that abstracts the experience completely so that, for example, the user might simply input an image and get as a rendered result a new image with little or even no direct interaction.

The above method for working with video is very similar to that for creating single static 2-D images. But, instead of working on a single image, the user works on a number of key frames in the video. The tool takes the parameters defined by the user to apply the tool to each key frame and interpolates these parameters across the frames between the key frames, providing 3-D model for each frame of the video.

One embodiment of each of the methods described herein is in the form of a computer program that executes on a processing system, e.g., a one or more processors that are part of a networked system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method implemented on a computer having memory, a processor, and a display, where the method comprises:
   accepting a file containing a 2-D image of a 3-D scene into memory, where the 2-D image includes a 2-D surface which is an image of a 3-D surface of an object in the 3-D scene;
   forming a first perspective model including a mathematical transformation re-projecting from the 2-D image to the 3-D scene, where said re-projecting includes using geometric information related to the object in the scene;
   identifying segments of a silhouette of the 2-D surface, where the segments include a first silhouette segment, a second silhouette segment, a third silhouette, and a fourth silhouette segment, where the first silhouette segment is opposite the second silhouette segment;
   generating a 3-D model using segments of a silhouette of the 2-D surface and said first perspective model, where said generating a 3-D model includes
      forming the 3-D spine, using the first perspective model, by re-projecting a 2-D spine disposed between the identified first silhouette segment and the identified second silhouette segment,
      forming one or more 3-D profile curves, using the first perspective model, by re-projecting one or more corresponding 2-D profile curves extending from the identified first silhouette segment to the identified second silhouette segment, where one of the one or more 2-D profile curves is the third silhouette segment, and
      interpolating the one or more 3-D profile curves along the 3-D spine;
   forming a second perspective model for projecting points from the 3-D model to the 2-D image; and
   projecting the 3-D model on the display using said second perspective model.

2. The method of claim 1, where said geometric information is two physical measurements of the object.

3. The method of claim 1, where said geometric information is an indication of the geometric shape of the 3-D surface.

4. The method of claim 3, where the indication is the geometric shape of the 3-D surface.

5. The method of claim 3, where the indication is of the cross-section of the 3-D surface.

6. The method of claim 1, where said obtaining geometric information includes obtaining user input.

7. The method of claim 6, where said generating the 3-D model includes iteratively repeating the steps of:
   generating the 3-D model;
   accepting user input of geometric information; and
   displaying the 3-D model on the display,
   such that the user provides user input to produce an acceptable 3-D model on the display.

8. The method of claim 1, where said generating the 3-D model further includes accepting user input defining one or more of the first silhouette segment, the second silhouette segment, one or more 2-D profile curves, or the 2-D spine.

9. The method of claim 1, where said generating the 3-D model includes iteratively repeating the steps of:
   identifying the first silhouette segment of the 2-D surface by accepting user input,
   identifying the second silhouette segment of the 2-D surface, and either
      determining a 3-D spine by re-projecting a 2-D spine identified by accepting user input; or
      determining one or more 3-D profile curves by re-projecting the one or more 2-D profiles identified by accepting user input, and
   generating the 3-D model by interpolating the one or more 3-D profile curves along the 3-D spine,
   such that the user provides user input to produce an acceptable 3-D model on the display.

10. The method of claim 1, where the image is obtained from a camera trained on the scene.

11. The method of claim 1, where said first perspective model or said second perspective model includes the camera field of view or EXIF data.

12. The method of claim 1, where said identifying the first silhouette segment on the 2-D surface includes defining the first corner point and defining the second corner point.

13. The method of claim 1, where said identifying the second silhouette segment on the 2-D surface includes defining the third corner point and defining the fourth corner point.

14. The method of claim 1, where one of the one or more 2-D profile curves includes the intersection of the 2-D profile curve and the 2-D spine.

15. The method of claim 1, where defining one or more 2-D profile curves includes defining one 2-D profile curve.

16. The method of claim 1, where defining one or more 2-D profile curves includes defining two 2-D profile curves.

17. The method of claim 1, where said defining the 2-D spine includes defining two points of the 2-D spine.

18. The method of claim 1, where said re-projecting points from the 2-D image to the 3-D scene is accurate to within a scale factor around the camera.

19. The method of claim 1, where said re-projecting points from the 2-D image to the 3-D scene re-projects points onto a pre-determined 3-D plane.

20. The method of claim 1, where a silhouette of the 3-D model projected onto to the 2-D image includes the first silhouette segment and the first silhouette segment.

21. The method of claim 1, further comprising:
   accepting a texture; and
   where said associating said feature includes applying the accepted texture to the generated mesh.

22. The method of claim 1, where said first perspective model or said second perspective model is a camera model.

23. The method of claim 1, further comprising:
   generating a mesh on the 3-D model,
   associating a feature with the generated mesh; and
   projecting the feature on the display.

24. The method of claim 1, where said projecting includes the computer automatically scaling the one or more 3-D profile curves to fit between the first silhouette segment and the second silhouette segment.

25. The method of claim 23, further comprising:
accepting artwork; and
where said associating said feature includes applying the accepted artwork to the generated mesh.

26. A system comprising:
a computer having memory, a processor, and a display, where the memory includes instructions for the processor perform the steps of claim 1.

* * * * *